United States Patent
Tilly et al.

(10) Patent No.: US 9,083,698 B2
(45) Date of Patent: Jul. 14, 2015

(54) METHOD AND SYSTEM FOR REMOTE OPERATION OF AN INSTALLATION

(75) Inventors: Lars Tilly, Limhamn (SE); Stefan Gripwall, Helsingborg (SE)

(73) Assignee: Zablox AB, Lund (SE)

( * ) Notice: Subject to any disclaimer, the term of this patent is extended or adjusted under 35 U.S.C. 154(b) by 149 days.

(21) Appl. No.: 13/883,841

(22) PCT Filed: Nov. 8, 2011

(86) PCT No.: PCT/SE2011/051331
§ 371 (c)(1),
(2), (4) Date: Jun. 11, 2013

(87) PCT Pub. No.: WO2012/064263
PCT Pub. Date: May 18, 2012

(65) Prior Publication Data
US 2014/0013407 A1    Jan. 9, 2014

(30) Foreign Application Priority Data

Nov. 9, 2010   (SE) ........................................ 1051172
Nov. 9, 2010   (SE) ........................................ 1051173

(51) Int. Cl.
*G06F 7/04*        (2006.01)
*G06F 17/30*       (2006.01)
(Continued)

(52) U.S. Cl.
CPC ........ *H04L 63/0823* (2013.01); *G07C 9/00103* (2013.01); *G08B 21/182* (2013.01);
(Continued)

(58) Field of Classification Search
CPC ..... H04L 63/062; H04L 63/064; H04L 63/08; H04L 63/0823; H04L 63/068; G08B 23/00
USPC ................ 705/3; 713/151, 152, 156; 726/5–6
See application file for complete search history.

(56) References Cited

U.S. PATENT DOCUMENTS 8,479,003 B2 *  7/2013  Yukawa et al. ................ 713/176
2002/0186845 A1 * 12/2002  Dutta et al. .................... 380/247
(Continued)

FOREIGN PATENT DOCUMENTS

WO    WO-2005/080720 A1    9/2005
WO    WO-2009/088901 A1    7/2009

OTHER PUBLICATIONS

International Search Report for PCT/SE2011/051331, mailed Mar. 9, 2012; ISA/SE.

*Primary Examiner* — Jeffrey Pwu
*Assistant Examiner* — Jayesh Jhaveri
(74) *Attorney, Agent, or Firm* — Harness, Dickey & Pierce, PLC

(57) ABSTRACT

The present invention relates to a method and a system for operating a device (100). The system comprises: a mobile communication device (700a), an internal server (300) and an external server (600), the external server (600) being adapted to generate a certificate and to send the certificate to the mobile communication device (700a), the mobile communication device (700a) being adapted to send a device specific command comprising the certificate to the internal server (300), the internal server (300) being adapted to check and validate the device specific command comprising the certificate, the internal server (300) being adapted to send a request to the device (100) to perform an action specified in the device specific command if the internal server (300) validates the device specific command comprising the certificate, the device (100) being adapted to perform the action, wherein the device specific command from the mobile communication device (700a) to the internal server (300) is adapted to be sent via a cellular network.

11 Claims, 3 Drawing Sheets

(51) Int. Cl.
*H04N 7/16* (2011.01)
*H04L 29/06* (2006.01)
*G07C 9/00* (2006.01)
*G08B 21/18* (2006.01)
*G08B 23/00* (2006.01)
*G08B 13/00* (2006.01)
*G08B 17/00* (2006.01)
*G08B 21/00* (2006.01)
*H04L 29/08* (2006.01)

(52) U.S. Cl.
CPC ............ H04L63/062 (2013.01); H04L 63/068 (2013.01); *G08B 13/00* (2013.01); *G08B 17/00* (2013.01); *G08B 21/00* (2013.01); *G08B 21/18* (2013.01); *G08B 23/00* (2013.01); *H04L 63/064* (2013.01); *H04L 63/08* (2013.01); *H04L 63/108* (2013.01); *H04L 67/12* (2013.01)

(56) References Cited

U.S. PATENT DOCUMENTS

| | | | |
|---|---|---|---|
| 2005/0033962 A1* | 2/2005 | Libin et al. | 713/170 |
| 2005/0071630 A1* | 3/2005 | Thornton et al. | 713/156 |
| 2006/0022816 A1 | 2/2006 | Yukawa | |
| 2006/0085633 A1* | 4/2006 | Balfanz et al. | 713/155 |
| 2006/0250578 A1 | 11/2006 | Pohl et al. | |
| 2007/0036110 A1* | 2/2007 | Preguica | 370/331 |
| 2007/0113093 A1* | 5/2007 | Lee | 713/175 |
| 2007/0222555 A1* | 9/2007 | Tengler et al. | 340/5.6 |
| 2007/0254630 A1* | 11/2007 | Moloney et al. | 455/410 |
| 2007/0289012 A1 | 12/2007 | Baird | |
| 2008/0022089 A1* | 1/2008 | Leedom | 713/156 |
| 2008/0082830 A1* | 4/2008 | Goulet | 713/177 |
| 2008/0148052 A1* | 6/2008 | Lindsley | 713/169 |
| 2010/0138911 A1 | 6/2010 | Lin et al. | |
| 2012/0172018 A1* | 7/2012 | Metivier | 455/414.1 |
| 2014/0282815 A1* | 9/2014 | Cockrell et al. | 726/1 |

\* cited by examiner

METHOD AND SYSTEM FOR REMOTE OPERATION OF AN INSTALLATION

CROSS-REFERENCE TO RELATED APPLICATIONS

This application is a 371 U.S. National Stage of International Application No. PCT/SE2011/051331, filed on Nov. 8, 2011, which claims priority to Swedish Patent Application No. 1051173-1, filed Nov. 9, 2010, and Swedish Patent Application No. 1051172-3, filed Nov. 9, 2010, the contents of which are hereby incorporated by reference in their entirety as if fully set forth herein.

TECHNICAL FIELD

The present invention relates to a method and a system for operating a device.

BACKGROUND ART

Conventional keys provide a well established access control to properties like buildings and vehicles. A problem with such keys is that they are easily lost and/or copied causing costly lock bolt replacements. Furthermore, real estate agents, craftsmen, and home-help service staff are usually quite reluctant when it comes to handling (customers') keys. There is a need for keys that are both secure and easy to use.

SUMMARY OF THE INVENTION

In view of the above, an objective of the invention is to solve or at least reduce one or several of the drawbacks discussed above. Generally, the above objective is achieved by the attached independent patent claims.

According to a first aspect, the present invention is realized by a method for operating a device. The method comprises: an external server generating a certificate, the external server sending the certificate to a mobile communication device, the mobile communication device sending a device specific command to an internal server, wherein the device specific command comprises the certificate, the internal server checking the device specific command comprising the certificate, if the internal server validates the device specific command comprising the certificate: the internal server sending a request to the device to perform an action specified in the device specific command, the device performing the action, wherein the device specific command from the mobile communication device to the internal server is sent via a cellular network.

By a certificate is generally meant a digital authorization. For example, the certificate may be a digital authorization which authorizes a person to operate a device. Further, in case the device is a door lock, the certificate may be thought of as a digital key.

By the method of the invention, it becomes easy and flexible to distribute certificates since the certificates are distributed in an electronic form to a mobile communication device from a server. Expressed differently, it becomes easy and flexible to authorize a person to operate a device, such as a door lock. Further, the method makes it easy for an authorized person to operate a device via a mobile communication device.

Further, the method is advantageous in that it is very secure since it operates via the cellular network. Furthermore, the method is advantageous in that a mobile communication device communicating via the cellular network is used for communication with the internal server, i.e. the mobile communication device need not be able to use WLAN, Bluetooth or other NFC (near field communication). The cellular network is advantageous in that it is robust, has a low uptime compared to ADSL and a high capacity, in that there is no wire to cut and difficult to tap. Moreover, if the mobile communication device is lost, the access for that specific mobile communication device is easily restricted which further increases the security. Furthermore, the method enables remote operating of the device.

The device specific commands sent by the mobile communication device to the internal server may be encrypted. Thereby the security is further increased.

Alternatively, instead of sending the certificate to the mobile communication device, the certificate is sent to a server. The server then forwards the certificate to a suitable party. This party could, e.g., be a mobile communication device.

The method may further comprise the mobile communication device signing the device specific command with a signing key before sending the device specific command to the internal server.

The method may further comprise: the external server generating the signing key, the external server sending the signing key to the mobile communication device, and the mobile communication device signing device specific commands using the signing key. This is advantageous in that the signing provides information on from which mobile communication device the device specific command has been sent.

The signing key may identify the mobile communication device by which a device specific command has been signed.

The certificate may be associated with the signing key. The certificate may certify the authenticity of the signing key. The authenticity may be guaranteed by a certificate provider which is associated with the external server. The signing key could, e.g., be encrypted with a public key of the certificate provider.

The external server may use a digital identification when generating at least one from the group of the certificate and the signing key. This is advantageous in that the security is even more increased. The identification may, e.g., be information stored in a magnetic striped card used in conjunction with a card reader. Alternatively, the identification may be an electronic identification provided by, e.g., a bank. As a further alternative, the identification may be of analogue type, i.e., the identification is at least one one-time code provided on a piece of paper.

The certificate and the signing key may be limited in time. This is advantageous in that the flexibility and security is increased.

The method may further comprise the external server or the internal server revoking the certificate. This is advantageous in that the flexibility and security is further increased. By revoking a certificate, is meant that the certificate is invalidated. In other words, the certificate may no longer be used to authorize a person to operate a device. In this way, previously generated certificates may be revoked such that they may no longer be used by a person to operate a device.

The device specific command from the mobile communication device to the internal server may be sent via an external server via the cellular network, wherein if the external server validates the certificate, the external server sends the device specific command to the internal server via the cellular network. This is advantageous in that the system is made even more secure. The mobile communication device does not need to know the IP address of the internal server, only the IP address of the external server.

The request from the internal server to the device may be sent via a short range wireless protocol. This is advantageous in that wires do not disturb the aesthetic appearance and in that the installation is simplified.

The short range wireless protocol may be at least one from the group of Bluetooth, ZigBee, and WLAN.

The method may further comprise at least one of: the internal server storing information about which mobile communication device has been validated by the internal server, or the external server storing information about which mobile communication device has been validated by the internal server. The internal server storing the information is advantageous in that the privacy of the involved parties is protected. The external server storing the information is advantageous in that the information is backed-up.

The method may further comprise setting certificates via a web interface. This is advantageous in that flexibility and ease of use is provided. Furthermore, the user is provided with a good overview.

The device may be a lock module, the device specific command may be a lock/unlock command, and the step of the device performing the action may be the lock module locking/unlocking. This is advantageous in that a mobile communication device is easily authorized for locking/unlocking the lock module which means that, e.g., a craftsman and/or a real estate agent can easily be authorized through his/her mobile communication device. Furthermore, a craftsman can be granted access to a home during a limited period of time, e.g., Monday-Friday and/or during limited hours, e.g., 8 a.m. to 4 p.m.

The lock module may comprise a mechanical lock. This is advantageous in that a conventional key can also be used.

The method may further comprise the external server generating the certificate upon receiving an alarm event. This is advantageous in that a party may gain access to the device when something undesirable has happened that needs to be dealt with.

The method may further comprise the external server selecting a first party from a predetermined list, wherein the selecting comprises selecting a party which is geographically closest to the internal server using Global Positioning System, and sending the certificate to the first party. This is advantageous in that the chances of reducing the damages caused by the undesirable event may be increased.

The method may further comprise the internal server generating an alarm event in case a sensor detects an undesirable event.

The sensor may be at least one from the group of a humidity detector, a liquid flow sensor, a smoke sensor, a fire detector, a capacitive sensor, and a crushing sensor.

The undesirable event may be at least one from the group of a fire, a leak, an overflow, and a housebreaking.

According to a second aspect, the present invention is realized by a system for operating a device. The system comprises: a mobile communication device, an internal server, and an external server, the external server being adapted to generate a certificate and to send the certificate to the mobile communication device, the mobile communication device being adapted to send a device specific command comprising a certificate to the internal server, the internal server being adapted to check and validate the device specific command comprising the certificate, the internal server being adapted to send a request to the device to perform an action specified in the device specific command if the internal server validates the device specific command comprising the certificate, the device being adapted to perform the action, wherein the device specific command from the mobile communication device to the internal server is adapted to be sent via a cellular network.

The advantages of the first aspect are equally applicable to the second aspect. Furthermore, the second aspect can be embodied in the corresponding embodiments of the first aspect.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION OF PREFERRED EMBODIMENTS OF THE INVENTION

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
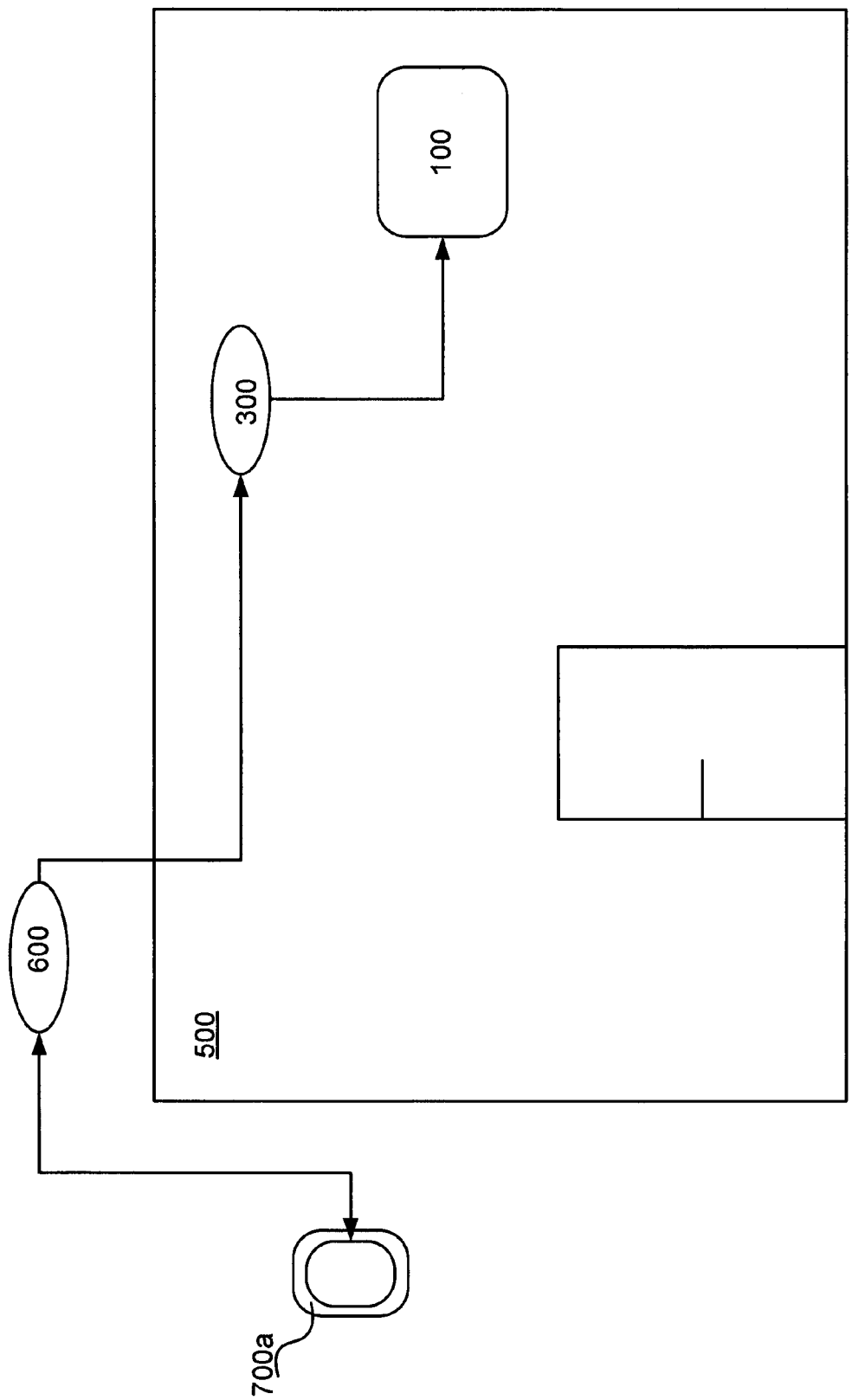
FIG. 1 is schematic drawing of an embodiment of the inventive system.

FIG. 1 discloses an embodiment of the inventive system for operating a device 100. The system comprises a mobile communication device 700a, an external server 600, and an internal server 300. The mobile communication device 700a sends a device specific command comprising a certificate to the external server 600, via a cellular network. Before sending the device specific command, the mobile communication device 700a signs the device specific command using a signing key. The external server 600 checks the signed device specific command comprising the certificate. If the external server 600 validates the signed device specific command comprising the certificate, the external server 600 forwards the signed device specific command comprising a certificate to the internal server 300. The internal server 300 checks the signed device specific command comprising the certificate. If the internal server 300 validates the signed device specific command comprising the certificate, the internal server 300 sends, via a short range wireless protocol, a request to the device 100 to perform an action specified in the signed device specific command. The device 100 then performs the action.

The certificate is generated by the external server 600 and sent to the mobile communication device 700a or, alternatively, to a server which can forward the certificate to the mobile communication device 700a. The mobile communication device can, e.g., be a mobile phone. The certificate is an authorization that authorizes the party to which the certificate is sent, e.g. the mobile communication device 700a, to send device specific commands to a certain device specified in the certificate.

In one embodiment, the certificate is generated in case an alarm event is generated.

The signing key identifies the mobile communication device by which a device specific command has been signed. More specifically, the signing key may comprise information regarding the identity of the mobile communications device by which a device specific command has been signed.

The certificate is associated with the signing key. The certificate certifies the authenticity of the signing key. The authenticity is guaranteed by a certificate provider which is associated with the external server 600. The signing key could, e.g., be encrypted with a public key of the certificate provider.

The certificate and/or the signing key may further be limited in time. For example, the certificate and/or the signing key may only be valid during business hours or during a specific day. In this way, the method and system may control when a user is allowed to operate a device by sending device specific commands.

The external server 600 may further revoke a certificate. As an effect of a certificate being revoked, a mobile communication device 700a that previously was authorized to send device specific commands is not allowed to do so any longer. The external server 600 may thus end an authorization by revoking the corresponding certificate.

In one embodiment, the device 100 is a network camera. The network camera is arranged in a fridge. The device specific command is that the network camera is to send an image of the contents of the fridge to the mobile communication device. Thus, the user will then know if he/she ought to buy some milk on the way home. The device specific command may further be that the camera is to at least one of rotate, pan, tilt, zoom, adjust brightness. Since a certificate is necessary, the system is secure and only authorized parties may have access to the fridge.

The skilled person realizes that other types of devices are also possible. The device could, e.g., be a coffee maker and the device specific command could be that the coffee maker is to be turned off. Alternatively, the device can be a heating unit and the device specific command could be that the heating unit is to be turned on.

Figure 2:
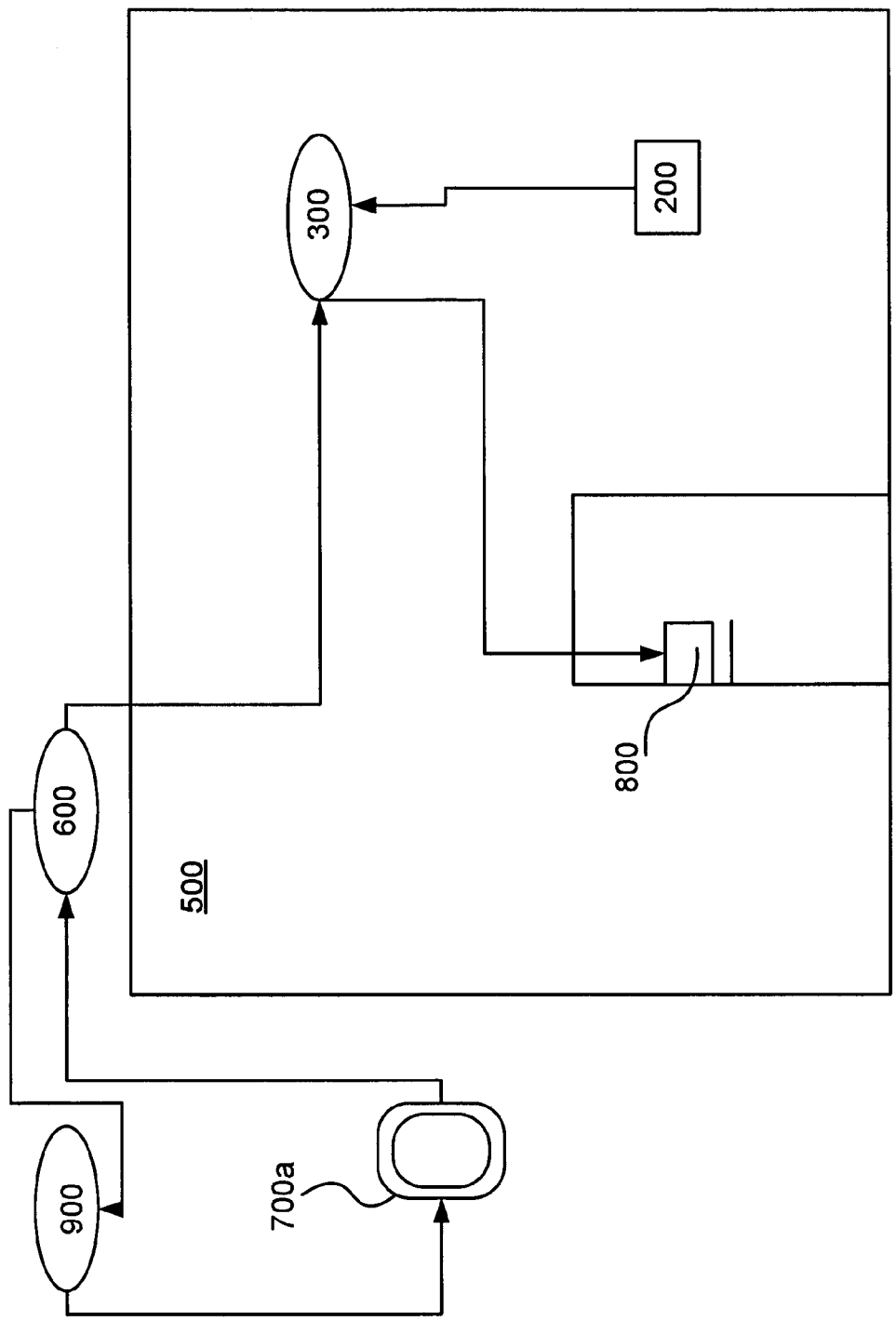
FIG. 2 is schematic drawing of an embodiment of the inventive system.

FIG. 2 discloses an embodiment in which the device is a lock module 800. The device specific command is a lock/unlock command. The device performing the action is the lock module 800 locking/unlocking. This embodiment enables that, instead of a mechanical key, a mobile communication device is used for locking/unlocking, e.g., a door. The information about which mobile communication devices have locked/unlocked a certain lock module can be stored in the internal server 300 and/or the external server 600. The information could also be presented in a web interface. In this way, it is possible to monitor, via the web interface, which mobile communication devices have locked/unlocked the lock module when. A parent can, e.g., see when the child is home again after school. A house owner is able to see when the cleaning firm or craftsman arrives and leaves.

In one embodiment, the system comprises at least one sensor 200. If the sensor 200 detects an undesirable event, the internal server 300 generates an alarm event. Then the internal server 300 sends a message to the external server 600 comprising information about which sensor has detected an undesirable event. The external server 600 generates a certificate and a signing key and sends the certificate and the signing key to a predetermined server 900 which forwards the certificate and the signing key to the mobile communication device 700a. The mobile communication device 700a, or more particularly the person in possession of the mobile communication device 700a, is then able to enter the location 500 in which the undesirable event was detected by unlocking the lock module 800.

In the case wherein the sensor is a crushing sensor arranged at, e.g., a window and the undesirable event is a housebreaking, the device is preferably a lock module. Thus, a predetermined party, such as a security officer, is able to quickly enter the house.

As an alternative, the sensor is a smoke sensor and/or a fire detector. In case smoke and/or a fire is detected, a message is sent from the internal server to a fire department. Furthermore, a certificate and a signing key is generated by the external server and sent to the fire department so that the fire department easily can enter the location wherein the fire and/or smoke has been detected by unlocking the lock module, thus obviating the need to break down the door.

As a further alternative, the sensor is a capacitive sensor arranged in, e.g., a basement, an attic, or in the foundation of a building. The capacitive sensor may be arranged to detect undesired moist due to leaks caused by, e.g., rain, bad facade, and/or an inferior foundation.

Figure 3:
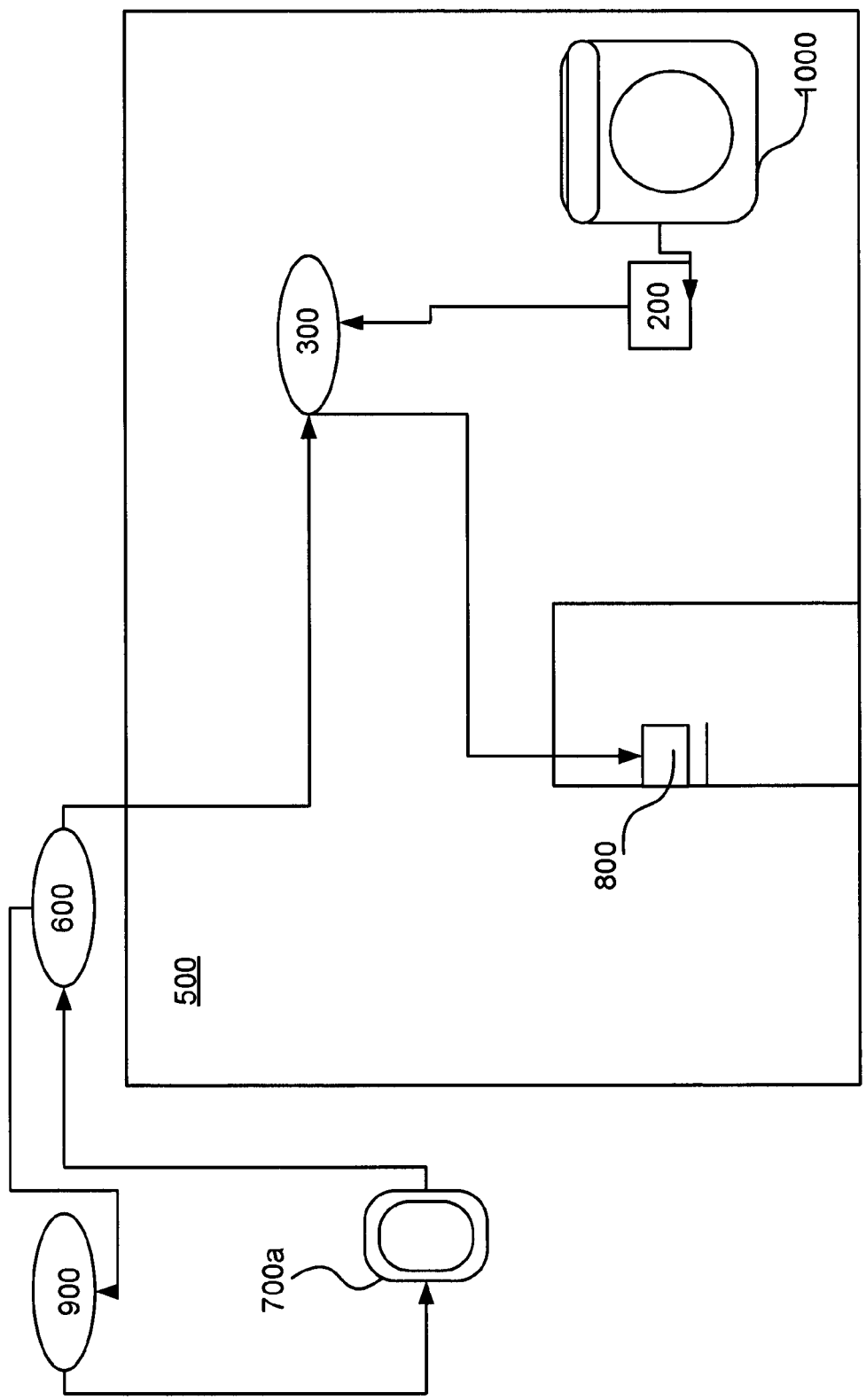
FIG. 3 is schematic drawing of an embodiment of the inventive system.

FIG. 3 discloses yet an embodiment. An appliance 1000 (here a washing machine) using a liquid undesirably emits part or the liquid. The sensor 200 detects that the appliance 1000 has undesirably emitted part of the liquid. If the sensor 200 is a humidity detector, the detected level of humidity is sent to the internal server 300 via the short range wireless protocol. The internal server 300 compares the received level of humidity with a predetermined value and generates an alarm event if the received level of humidity is larger than a predetermined value. If the sensor 200 is a sensor arranged at an inlet of the appliance 1000, the sensor 200 detects how much liquid flows into the appliance 1000 per unit of time and sends the detected values to the internal server 300 via the short range protocol. The internal server 300 computes the amount of liquid that has flown into the appliance 1000 at a certain point of time using the information from the sensor 200. In case the computed amount of liquid is larger than a predetermined value, the internal server 300 generates an alarm event. The internal server 300 sends a message to the external server 600 comprising information on that an alarm event has been generated and which appliance 1000 caused the alarm event to be generated.

In response to the alarm event, the external server 600 sends a certificate and a signing key to a predetermined first party 900. The predetermined first party 900 may, e.g., be a server at, e.g., a plumbing firm. The predetermined first party 900 forwards the certificate and the signing key to the mobile communication device 700a. The person having the mobile communication device 700a sees to that a signed unlock command is sent to the external server 600. The signed unlock command comprises the certificate. The external server 600 routes the signed unlock command to the correct internal server, in this case server 300. If the server 300 validates the certificate, the internal server 300 sends an unlock command to the lock module 800. The lock module 800 unlocks and the person holding the mobile communication device 700a can enter the location and hopefully reduce the damages caused by the emitted liquid.

In response to the alarm event, a message is sent to the owner of the appliance 1000, saying that appliance 1000 has caused an alarm event to be generated.

The invention claimed is:

1. A method for operating a device comprising:
   an external server selecting a first party from a predetermined list, wherein the selecting comprises selecting a party which is geographically closest to an internal server using Global Positioning System, generating a certificate upon receiving an alarm event, and sending the certificate to the first party,
   the external server sending the certificate to a mobile communication device,
   the mobile communication device signing a device specific command with a signing key being associated with the certificate, wherein the certificate certifies the authenticity of the signing key and the signing key identifies the mobile communication device by which the device specific command has been signed, and sending the device specific command to the internal server, wherein the device specific command comprises the certificate,
   the internal server checking the device specific command comprising the certificate, if the internal server validates the device specific command comprising the certificate:
   the internal server sending a request to the device to perform an action specified in the device specific command,
   the device performing the action,
   wherein the device specific command from the mobile communication device to the internal server is sent via a cellular network.

2. The method according to claim 1, further comprising:
   the external server generating the signing key,
   the external server sending the signing key to the mobile communication device, and
   the mobile communication device signing device specific commands using the signing key.

3. The method according to claim 2, wherein the external server uses a digital identification when generating at least one from the group of the certificate and the signing key.

4. The method according to claim 1, wherein the certificate and/or the signing key are limited in time.

5. The method according to claim 1, further comprising:
   the external server or the internal server revoking the certificate.

6. The method according to claim 1, wherein the device specific command from the mobile communication device to the internal server is sent via the external server via the cellular network,
   wherein if the external server validates the certificate, the external server sends the device specific command to the internal server via the cellular network.

7. The method according to claim 1, wherein the request from the internal server to the device is sent via a short range wireless protocol.

8. The method according to claim 7, wherein the short range wireless protocol is at least one from the group of Bluetooth, ZigBee, and WLAN.

9. The method according to claim 1, further comprising at least one of:
   the internal server storing information about which mobile communication device has been validated by the internal server, or
   the external server storing information about which mobile communication device has been validated by the internal server.

10. The method according to claim 1, further comprising setting certificates via a web interface.

11. The method according to claim 1,
    wherein the device is a lock module,
    wherein the device specific command is a lock/unlock command, and
    wherein the step of the device performing the action is the lock module locking/unlocking.

\* \* \* \* \*

UNITED STATES PATENT AND TRADEMARK OFFICE
CERTIFICATE OF CORRECTION

PATENT NO. : 9,083,698 B2  
APPLICATION NO. : 13/883841  
DATED : July 14, 2015  
INVENTOR(S) : Tilly et al.

Page 1 of 1

It is certified that error appears in the above-identified patent and that said Letters Patent is hereby corrected as shown below:

On the title page item (73) Assignee: "Zablox AB" should be corrected to --Zaplox AB--

Signed and Sealed this  
Fifth Day of July, 2016

Michelle K. Lee  
*Director of the United States Patent and Trademark Office*